United States Patent
Somayazulu (10) Patent No.: US 6,205,168 B1
(45) Date of Patent: Mar. 20, 2001

(54) SEQUENTIAL DETECTION SYSTEM AND METHOD WITH ADAPTIVE BIAS

(75) Inventor: V. Srinivasa Somayazulu, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/191,461

(22) Filed: Nov. 12, 1998

(51) Int. Cl.[7] ................. A61F 2/06; H04L 27/30
(52) U.S. Cl. ................. 375/149; 375/142; 375/150; 375/152
(58) Field of Search ............ 375/149, 150–152, 375/140, 141, 142–143, 130, 134, 137, 343; 370/335, 342

(56) References Cited

U.S. PATENT DOCUMENTS

| | | |
|---|---|---|
| 4,387,465 | 6/1983 | Becker . |
| 5,638,362 | 6/1997 | Dohi et al. ............... 370/342 |
| 5,642,377 | 6/1997 | Chung et al. . |
| 5,691,974 * | 11/1997 | Zehavi et al. ............ 375/142 |
| 5,950,131 * | 9/1999 | Vilmur ....................... 370/203 |
| 6,049,535 * | 4/2000 | Ozukturk et al. ........ 455/434 |
| 6,064,690 * | 5/2000 | Zhou et al. ............... 370/335 |
| 6,085,104 * | 7/2000 | Kowalski et al. ........ 455/506 |

\* cited by examiner

*Primary Examiner*—Stephen Chin
*Assistant Examiner*—Lenny Jiang
(74) *Attorney, Agent, or Firm*—David C. Ripma; Matthew D. Rabdau; Scott C. Krieger (57) ABSTRACT

An adaptive CDMA sequential detection method is provided. The method permits the use of the sequential detection process to determine an unknown spreading code in an environment where the signal to noise ratio of the received signal varies. A communication system, such as W-CDMA, provides a periodic reference signal that the receiver can demodulate without the spreading code. The reference signal is used to estimate and constantly update the signal to noise calculation. From this estimate a bias is updated for use in the sequential detection of the spreading code. A system to update the CDMA sequential detector bias value is also provided.

20 Claims, 5 Drawing Sheets

SEQUENTIAL DETECTION SYSTEM AND METHOD WITH ADAPTIVE BIAS

BACKGROUND AND SUMMARY OF THE INVENTION

This invention relates generally to cellular telephone communications, and more particularly to a system and method for CDMA receivers to adaptively change the bias in the sequential detection of a code, to account for the effects of fading.

Spread spectrum communication techniques allow communicating users to operate in noisy radio frequency (RF) spectrums, and are especially effective against narrow-band interferers. Spread spectrum communications can be effected at relatively low power spectral densities, and multiple users can share the same frequency spectrum. Further, receivers can be designed to protect against multipath. These system characteristics encouraged early development of the technology by the military.

Common forms of spread spectrum systems include chirp, frequency hopping, and direct sequence or pseudonoise (PN). The chirp system transmits an impulse signal in the time domain that is spread monotonically in the frequency domain. A receiver converts the spread frequency signal back into an impulse signal. These frequency-spread impulse signals have applications in radar, for the pulse position modulation of information, or both, such as the $R^3$ transponder developed by General Dynamics, Electronics Division in the 1970s. Frequency hopping systems communicate by synchronizing users to simultaneously change the communication frequency.

Direct Sequence systems spread a digital stream of information, typically in a quadriphase modulation format, with a PN code generator, to phase shift key modulate a carrier signal. The pseudonoise sequence of the PN code generator is periodic, and the spread signal can be despread in a receiver with a matching PN code. Direct Sequence systems have excellent immunity to noise. The PN codes used typically permit a large number of users to share the spectrum, with a minimum of correlation between the user's PN codes. However, Direct Sequence system require large RF bandwidths and long acquisition times.

The IS-95 standard defines key features of the so-called second generation code division multiple access (CDMA) communication system, a type of Direct Sequence spread spectrum modulation. The IS-95 system communicates information from the base station to the mobile stations through a series of traffic channels. These traffic channels are transmit and receive information, i.e. digitized audio signals, spread with a traffic channel PN code, unique to each mobile station. Using this precise timing and phase information derived from the pilot channel, the mobile station is able to acquire a setup channel, and eventually, the overall System Time. With this System Time, the mobile station is able to differentiate between base stations and synchronize the demodulation circuitry with sufficient accuracy to recover the received traffic channel message.

A third generation, wideband CDMA (W-CDMA) system is in development as described in "Wideband-CDMA Radio Control Techniques for Third Generation Mobile Communication Systems", written by Onoe et al., IEEE 47$^{th}$ Vehicular Technology Conference Proceedings, May 1997, that may have global applications. Instead of a pilot channel, the W-CDMA system has a broadcast, or perch channel. Each timeslot, or slot of the broadcast channel consists of a series of time multiplexed symbols. A long code masked, or special timing symbol segment uses just a short code to spread one symbol of known information. This segment allows a mobile station to acquire system timing information immediately after turn-on. The pilot, or reference symbols are similar to the IS-95 pilot channel. In one proposal, 4 reference symbols, with each symbol being 2 bits, are spread with a long code and a short code. The reference symbol information and the short code are known by the mobile stations. The long code is unique to each base station, so that timing information is refined, once the long code is known (the base station is identified). Other combinations of reference, special timing, and data symbols are also possible.

The W-CDMA system also includes several traffic channels to communicate information, such as a digitized voice or data. The traffic channel predominately includes information, but may also include a reference symbol segment. For example, at a data rate of 32 kilosymbols per second (ksps), a slot could include 4 pilot symbols and 16 information symbols. Precise timing information can be derived during the reference symbols segment of the traffic channel message, but not during the information segments.

Sequential detection techniques are well known for determining the code used to spread information, from a group of candidate codes. The advantage of such a technique is the relatively quick rejection of false candidate codes. Since all but one of the candidate codes is false, the quick dismissal of false codes greatly speeds the acquisition of the correct code. A bias value is added to the integrated despreading results. The biased output follows a different (positive) slope when the correct code is used. When an incorrect code is used the biased output follows a negative slope. When the biased output results falls below a minimum threshold, it is determined that the current code is incorrect, and a new candidate code is selected. When the biased output exceeds a maximum threshold, the candidate code must be the spreading code.

The sequential detection system works very well in controlled environments where the signal to noise ratio of the received signal is known. Then, the bias value remains constant. However, the bias value required for sequential detection is constantly changing in many real-world applications, such as in cell phone communications. The signal to noise ratio of the signal being received is constantly changing as the receiver moves, and as the number of communications in the system varies.

Co-pending patent application, Ser. No. 09/015,424, invented by Kowalski et al. entitled SYSTEM AND METHOD FOR CDMA CHANNEL ESTIMATION, attorney docket no. SMT 301, filed on Jan. 29, 1998, and assigned to the same assignees as the instant application, discloses a procedure for using timing, derived from the perch channel in a wideband CDMA system, to despread and demodulate the traffic channels. Although the system simplifies the operation of the traffic channel, no particular system for simplifying the search for a long code is presented.

It would be advantageous if a CDMA receiver design could simplify the task of determining the long code being used by a base station to code a transmitted message.

It would be advantageous if a bias could be calculated for use in the sequential detection of CDMA type signals when the signal to noise ratio of the received signals is ever-varying.

In a system where the signal to noise ratio of the received signals varies, it would be advantageous if the bias value could be calculated in response to the varying signal to noise ratio. It would be advantageous if a spreading code could be determined through sequential detection with the use of the varying bias value.

Accordingly, in a wideband code division multiple access (W-CDMA) communication system including a base station transmitting a channel of information spread with a unique first long code, a sequential searching receiver with an adaptive threshold bias is provided. For reasons explained below, the adaptive sequential detection technique described herein only works when a periodic pattern of bits can be established for reference. These reference bits, known as a long code masked symbol, must be of known value, i.e., all 1s, and must not be spread with the first long code. The W-CDMA system provides such reference bits.

The receiver comprises a short code matched filter (MF) having an input to receive the transmitted channel of information spread with the first long code. The short code MF has an output to provide an output peak signal corresponding to the first long code masked symbol. The receiver also includes a timing and code management (TCM) circuit having an input operatively connected to the short code matched filter output. The TCM circuit computes a bias based on the amplitude of the first long code masked symbol peak output, and computes the timing relationships from the interval between long code masked symbol peak outputs. The TCM circuit has an output to provide the bias.

The receiver also includes a searcher unit having a first input to accept the transmitted spread first long code, and a second input operatively connected to the TCM circuit output. The searcher unit correlates the first long code against candidate long codes, integrating the correlation results, and using the bias to adjust the integrated correlation results. The searcher compares the biased integrated correlation results to pass/fail criteria. The searcher generates a selected candidate code to despread the first long code, when the pass criteria is fulfilled. In this manner, the searcher compensates for the effects of fading in the transmitted signal, and permits the use of a sequential detection technique to search for a spreading code.

A method for a mobile station receiver to acquire the base station through the sequential detection of the first long code from a plurality of long code candidates is also provided. The method comprises the steps of:

a) despreading the received channel with a candidate long code;

b) continuously integrating the output of the despreading process of Step a);

c) adding a bias to the integrated output of Step b);

d) establishing an acceptance threshold;

e) comparing the biased integrated output to the acceptance threshold; and f) selecting a candidate long code as the first long code in response to the comparison of Step e), whereby the base station is acquired.

In some aspects of the invention, further steps follow Step c), of:

g) establishing a rejection threshold;

h) comparing the biased integrated output to the rejection threshold;

i) in response to the comparison to the rejection threshold, rejecting the candidate long code as the transmitted long code; and j) selecting a new long code candidate.

Typically, the channel of information spread with the first code is subject to fading in transmission from the base station to the mobile station receiver, then further steps follows Step a), of:

$a_1$) measuring the amount of fade in the received channel of information; and

In addition, Step c) includes adjusting the bias in response to the amount of measured fade, whereby the number of incorrect long code acceptance/rejection selections are reduced. In some aspects of the invention, Step $a_1$) measures the amplitude of the despread transmitted channel during the long code masked symbol, and Step c) includes adjusting the bias value in response to the amplitude measured during the long code masked symbol, whereby the bias value is adjusted for the effects of fading.

DETAILED DESCRIPTION OF THE PREFERRED EMBODIMENT

An algorithm for the searcher function in W-CDMA, based on the variable window size (or sequential) detector is presented herein. The function of the searcher is to identify the long code corresponding to a given perch channel or a multipath component of the same. In Phase 3 of the searcher's operation, described below, a long code group is identified. The group consists of 4–32 long codes. Phase 4, described below, consists of identifying which of these codes is the one that is being transmitted on the given perch channel.

The basic principles of the variable window size detector are well known. In the present invention, the upper and lower detection thresholds, or code accept/reject criteria remain constant. The bias, however, can be adjusted from slot to slot, based on an estimate of the signal strength that is obtained from the output of the common short code matched filter. Due to multipath fading, the signal amplitude varies, and by scaling the bias according to the signal strength, the bias is always kept close to its optimal value. Thus, a feature of the W-CDMA system is exploited to improve searcher performance.

The basic algorithm for the variable window size searcher, is as follows:

1. Pick the short code matched filter output peak whose corresponding long code is to be identified. This determines the received signal frame, slot, and symbol timing. Denote the complex received perch channel signal as $r_1(n)$. This is essentially the long code transmitted on that particular perch channel path, except for the one symbol every slot when the long code is masked and a common short code is transmitted. This is because the orthogonal short code used on the perch channel to overlay the long code is the zeroth Walsh-Hadamard code of order 256.

2. Compute the short code matched filter output once every slot when the long code masked symbol occurs. The magnitude squared output stream from the matched filter at slot number $n_{slot}$ is given by $$Y_{LMS}(n_{slot}) = Y^2_{MF,i} + Y^2_{MF,q}$$

This output is filtered to remove some of the noise (in a simulation, presented below, a 5 tap linear phase FIR filter with a 3 dB frequency of roughly 200Hz is used). This filtered output occurring at slot spaced intervals forms an estimate of the desired long code signal strength in that slot period. The bias parameter for the variable window size searcher during the slot numbered $n_{slot}$ is computed as $$B = B_c Y_{LMS}(n_{slot}) \quad (1)$$

where $B_c$ is a constant.

3. Generate the complex long code $c_{l,i}(n)$ with long code index $i \in \{1, \ldots, C_g\}$.

4. Start/update one chip correlation:

$$Y_n(k) = Y_n(k-1) + r_{l(n)} c^*_{l,i}(n) \quad (2)$$

Here, k is the correlation index, i.e., the current length of the correlation window, and n is the chip time index of the received signal and the locally generated code ($k \in \{1, \ldots, MAX\_CORR\_LEN\}$, where MAX_CORR_LEN is the maximum allowed correlation length, and ($n \in \{1, \ldots, FRAME\_LENGTH\}$). The "*" represents complex conjugation.

5. Form the decision variable of the searcher $Y_{dec}(k,n)$, as follows:

$$Y_{dec}(k,n) = |Y_n(k)|^2 - Bk$$

6. Decision step:

If $Y_{dec}(k,n) \geq T_{up}$, code i is a candidate. Set candidate flag to 1, and update flag to 0.

If $Y_{dec}(k,n) \leq T_{down}$, code i is not a candidate. Set candidate flag to 0, and update flag to 1.

If $T_{up} > Y_{dec}(k,n) > T_{down}$, no decision yet. Continue with the correlation, increment n and k and return to Step 4.

7. Processing Candidates (Candidate flag is set to 1):

Increment candidate counter. If counter=$C_{max}$ (set to 4), then candidate is verified, then increment 'hit' count for code number by one: $R_i = R_i + 1$. Set candidate counter to 0, and update flag to 1.

If counter<$C_{max}$, candidate not yet verified, then reinitialize correlator $Y_n(k)=0$. Set k to 0, candidate flag to 0, and return to Step 4.

8. Code update step (Update flag is set to 1):

Reinitialize correlator $Y_n(k)=0$. Set k to 0, i=i+1 modulo $C_g$. Set update flag to 0, candidate match counter to 0, and return to Step 3.

9. At the end of $N_{frame} = C_g/8$ frames, identify the code m for which the code 'hit' counter $R_m$ is the maximum among all the $R_i, I \in \{1, \ldots, C_g\}$. The long code index resulting from the searcher operation is thus m.

Because the perch channel signal format is such that each of the 16 slots in a frame includes 4 pilot symbols, 1 long code masked symbol, and 5 unknown data symbols, the following modifications are added:

Because of the unknown data symbols, we do not let a correlation window extend across a symbol boundary. Thus, in Step 4 above, if $\lfloor n/PC\_PROCGAIN \rfloor \neq \lfloor (n-1)/PC\_PROCGAIN \rfloor$, then (PC_PROCGAIN=256 is the perch channel processing gain, the number of chips per symbol, and $\lfloor x \rfloor$ denotes the largest integer less than x), then we reinitialize the correlation: set $Y_{rc}(k)=0$, and k=0.

Finally, since the last symbol in every slot is the long code masked symbol, we skip the symbol during the correlation: i.e., when the symbol counter indicates the last symbol in the slot has been reached, then in Step 4, set n=n+PC_LMS_LEN, where PC_LMS_LEN=256 is again equal to the perch channel processing gain.

For the optimal choice of the bias parameter, the upper and lower thresholds can be derived based on approximate expressions for the probabilities of detection and false alarm. However, in practice, in a fading channel and with unknown amount of noise, the optimal bias value is of course not known. In the present invention, this bias value is approximated based on the output of the short code matched filter, which represents an estimate of the signal plus noise. The corresponding values of the two detection thresholds must then be determined through a process of simulations/experiments with a wide range of channel models, path gains, and typical SNR values. This kind of "tuning" or the parameters must be done for final implementation.

Another unique point of the searcher is the "maximum hit count detector", which is a sort of rank ordering filter. This provides quite a robust detector. Another implication of using this is that the correlation detector algorithm itself can be biased to provide some higher probability of detection $P_D$ at the expense of some increased false alarm probability $P_{FA}$. This is also something that is best determined through extensive simulations/lab. experiments.

Figure 1:
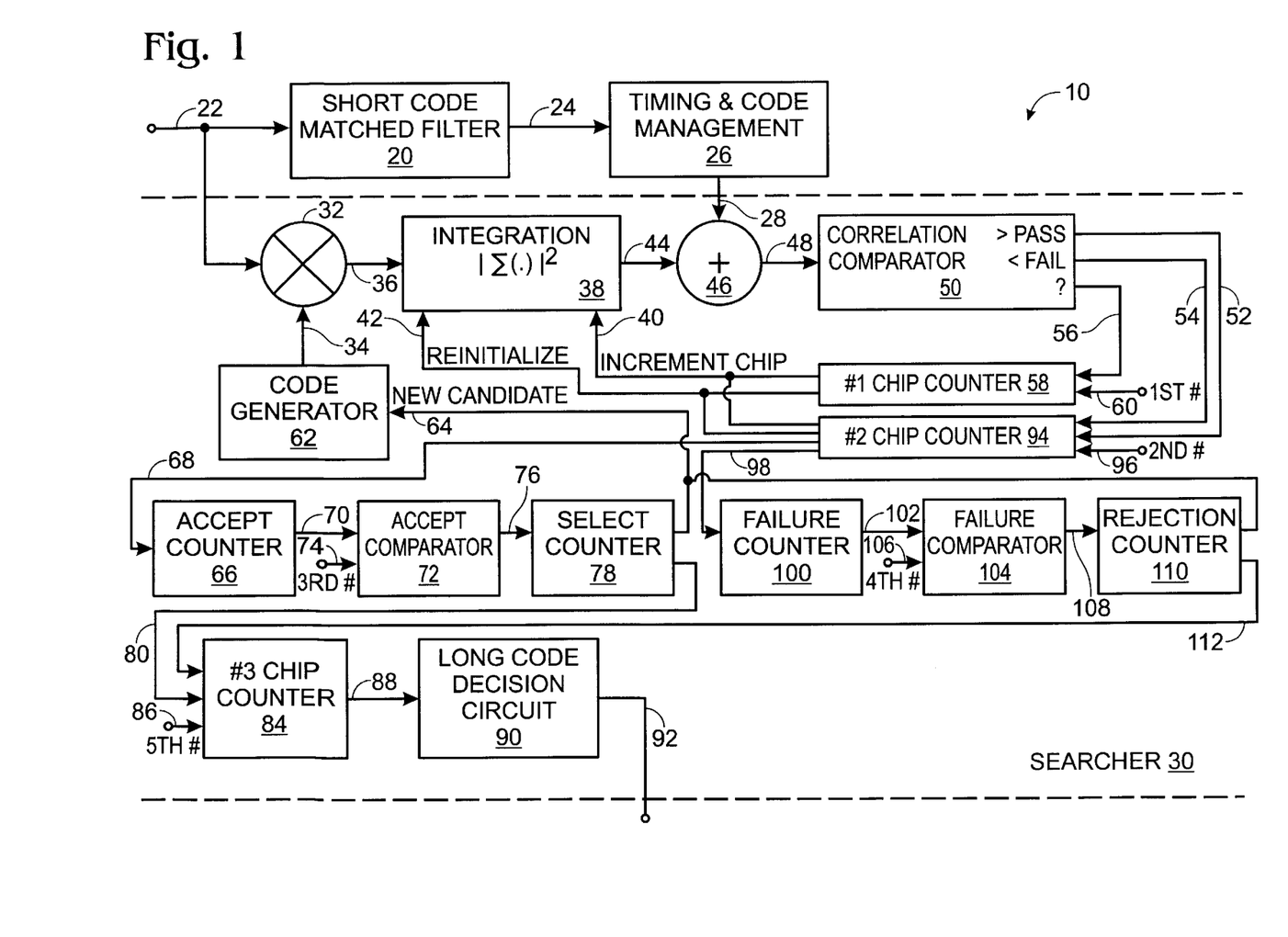
FIG. 1 is a block diagram schematic of a sequential searching receiver with adaptive threshold biasing.

FIG. 1 is a block diagram schematic of a sequential searching receiver 10 with adaptive threshold biasing. The receiver operates in a wideband code division multiple access (W-CDMA) communication system including a base station transmitting a channel of information spread with a unique first long code. The W-CDMA system has a least one channel, the perch channel, with long code masked bits. These bits occur at regular, periodic intervals. The long code masked symbols are bits of known information that are spread without the long code. These bits are spread with just a short code that is known by the receiver. Therefore, the receiver can always decode these bits. The amplitude of the decoded information provides an indication of the signal strength of the received signal. Ultimately, the signal strength is used to derive the adaptive bias needed for CDMA sequential detection in noisy environments. The system and method of the present invention apply to any potential CDMA system using known, periodic reference signals.

Figure 2:
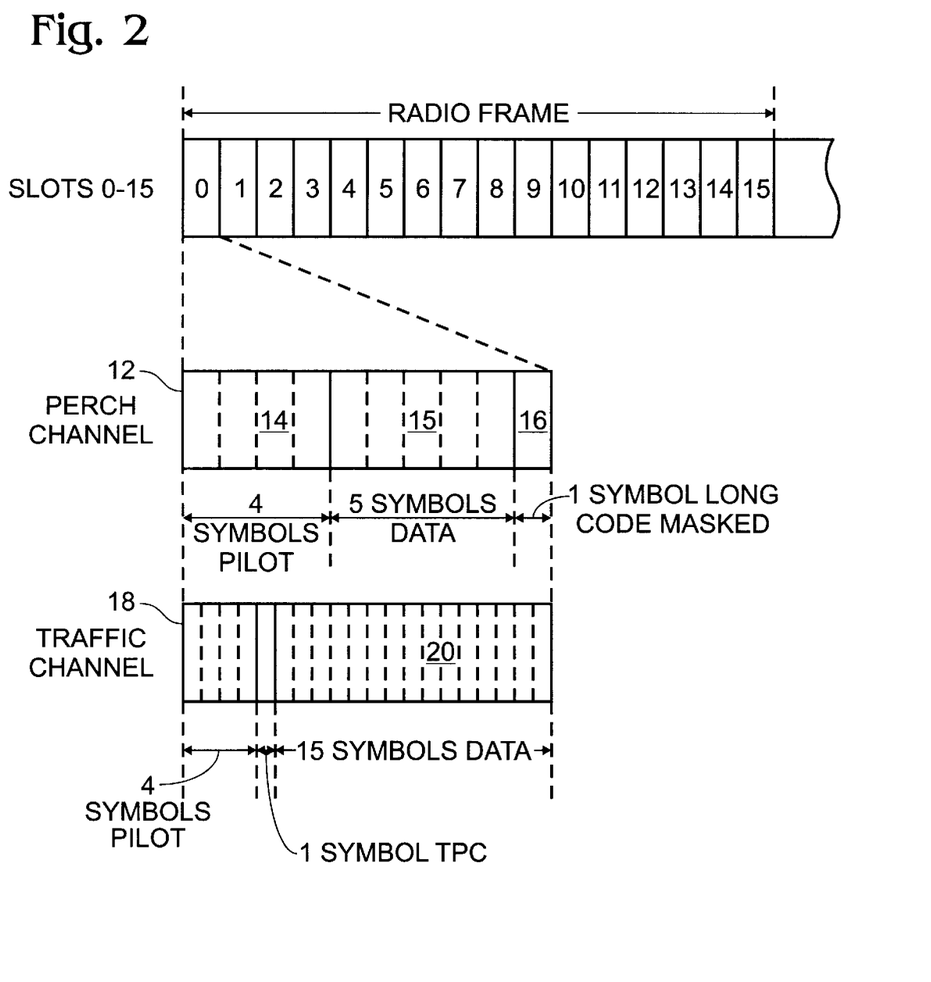
FIG. 2 is a time domain representation of an aspect of the W-CDMA message system.

FIG. 2 is a time domain representation of an aspect of the W-CDMA message system. The messages are divided into divisions of time called frames, with each frame having 16 slots. In one aspect of the invention, perch channel 12 includes four pilot symbols 14, five data symbols 15, and one long code masked symbol 16. Long code masked symbol 16 is repeated every slot, or varied in a known manner, sixteen times a frame. Receiver 10 is applicable to any system regardless of the number of long code masked symbols 16 per slot, pilot symbols 14 per slot, data symbols 15 per slot, or slots per frame, as long as the intervals between long code masked symbols, and the manner of long code variations, are known.

Returning to FIG. 1, receiver 10 comprises a short code matched filter (MF) 20 having an input on line 22 to receive the transmitted channel of information spread with the first long code, and an output on line 24 to provide an output peak signal corresponding to the first long code masked symbol. A timing and code management (TCM) circuit 26 has an input on line 24 operatively connected to the output of short code matched filter 20. Timing and code management circuit 26 computes a bias based on the amplitude of the first long code masked symbol peak output, and computes timing relationships from the interval between long code masked symbol peak outputs. Timing and code management circuit 26 has an output on line 28 to provide the bias.

A searcher unit 30 has a first input on line 22 to accept the transmitted spread first long code, and a second input on line 28 operatively connected to the output of timing and code management circuit 26. Searcher unit 30 correlates the first long code against candidate long codes. Typically, receiver 30 is provided with a list of possible long codes. Each of the possible long codes from the list is a candidate. Searcher 30 integrates the correlation results, using the bias to adjust the integrated correlation results, and compares the biased integrated correlation results to pass/fail criteria. Searcher 30 generates a selected candidate code to despread the first long code. The selected candidate code is one that has passed the criteria test. In this manner, the bias is adjusted for the effects of fading in the transmitted signal.

Figure 3:
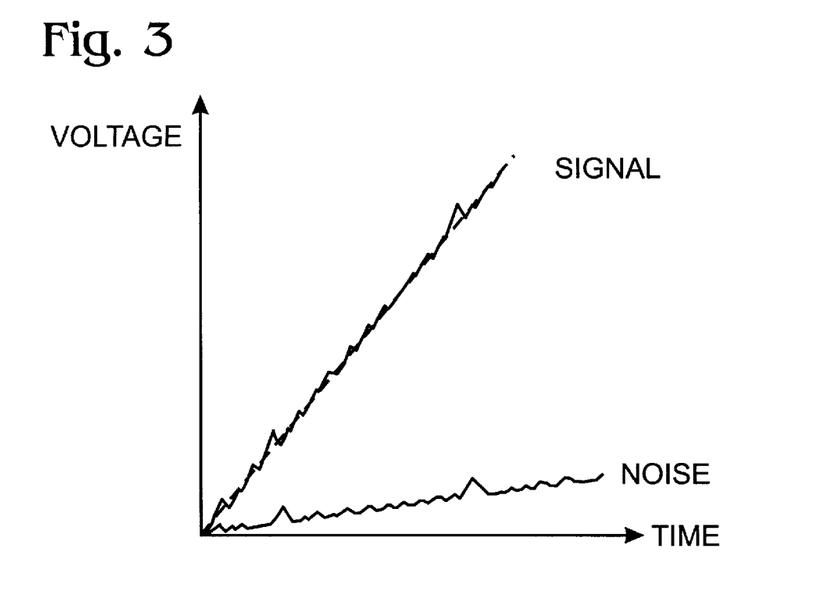
FIG. 3 is a graph illustrating integrated correlation results without a bias.

FIG. 3 is a graph illustrating integrated correlation results without a bias. One trace on the graph is labeled noise. These are the results of correlating an input signal with an incorrect long code (plus noise). The trace labeled signal trace is the result of correlating the input signal with the correct long code (plus noise). The signal and noise traces have different slopes. Note, the signal trace also includes the noise.

Figure 4:
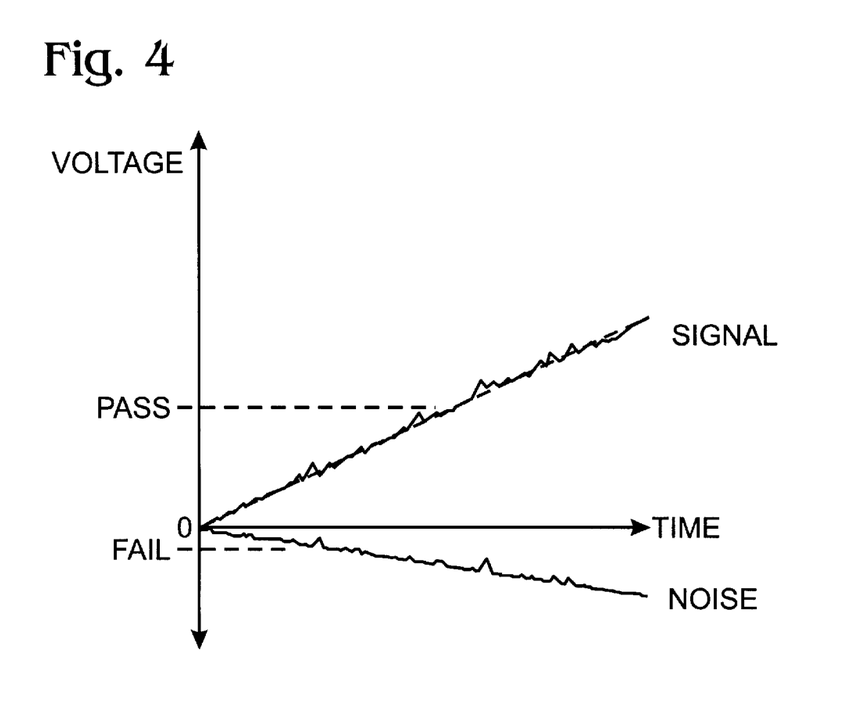
FIG. 4 is a graph illustrating integrated correlation results with a bias.

FIG. 4 is a graph illustrating integrated correlation results with a bias. The use of a bias voltage permits the trace to be put in a different quadrant from the signal (signal+noise) trace. Pass/fail criterion can be established with the use of a bias. When the noise trace falls below a minimum level (fail criteria) the candidate is rejected and a new candidate code is tested. When the trace exceeds a maximum level (pass criteria), the candidate long code is selected as the first long code.

Returning to FIG. 1, searcher unit 30 comprises a mixer 32 having a first input on line 22 operatively connected to the first input of searcher 30 to accept the transmitted first long code spread channel. Mixer, or multiplier 32 has a second input on line 34 to accept the candidate long code, and an output on line 36 to provide the correlation results.

An integration circuit 38 has a first input on line 36 operatively connected to the output of mixer 32. Integration circuit 38 has a second input on line 40 to receive the chip count signal to integrate the correlation results over the next chip. Integration circuit 38 has a third input on line 42 to receive a reinitialize signal to reinitialize the correlation results, and an output on line 44 to provide the integrated correlation results.

A summing circuit 46 has a first input on line 44 operatively connected to the output of integrator 38, and a second input on line 28 operatively connected to the second input of searcher 30 (the output of TCM circuit 26) to accept the bias. Summing circuit 46 has an output on line 48 to provide the integrated and biased correlation results. In the arrangement shown in FIG. 1, summing circuit 46 accepts the integrated results of every bias value with the previous bias values, until reset. The integration and reset functions are typically carried out in TCM 26. Alternately, but not shown, summing circuit 46 is placed before integrator 38 to sum the pre-integrated correlation results with the bias. Then, integrator 38 integrates the bias/correlation sum.

A correlation comparator 50 has a first input on line 48 operatively connected to the output of summing circuit 46. Correlation comparator 50 compares the integrated and biased correlation results to a pass threshold and a fail threshold. Correlation comparator 50 has a first output on line 52 to provide a signal when the biased correlation results exceed the pass threshold, a second output on line 54 to provide a signal when the biased correlation results are less than the fail threshold, and a third output on line 56 to provide a signal when the biased correlation results meet neither the pass nor fail criterion.

A first chip counter circuit 58 has a first input on line 56 operatively connected to the third output of correlation comparator 50, and a first output on line 40 operatively connected to the second input of integration circuit 38 to increment the chip count by one. First chip counter 58 has a second input on line 60 to accept a first predetermined number. First chip counter 58 compares the chip count to the first number. First chip counter 58 has a second output on line 42 operatively connected to the third input of integration circuit 38 to reinitialize the integration process after a pass/fail decision is not reached within the first number of correlated chips.

A long code candidate generator 62 has an output on line 34 operatively connected to the second input of mixer 32 to provide the candidate long code. Long code candidate generator 62 also has an input on line 64. Long code candidate generator 62 provides a new candidate long code in response to a signal at the input.

An acceptance counter 66 has an input on line 68 operatively connected to the first output of correlation comparator 50 to accept the pass criteria signal. Acceptance counter 66 increments an acceptance count in response to an input signal and provides the acceptance count at an output on line 70.

An acceptance count comparator circuit 72 has an input on line 70 operatively connected to the output of acceptance counter 66. Acceptance count comparator 72 compares the acceptance count to a third predetermined number input on line 74. Acceptance count comparator 72 provides a signal at an output on line 76, if the acceptance count does equal the third number.

A select counter 78 has an input on line 76 operatively connected to the output of acceptance count comparator 72. Select counter 78 increments the select count of each long code candidate in response to an input signal. Select counter 78 provides the select count at a first output on line 80 and a signal to select a new long code candidate at a second output on line 64 operatively connected to the input of long code generator 62.

A third chip counter 84 has a first input on line 80 operatively connected to the output of select counter 78 to check the number of frames processed in response to an input signal. Third chip counter 84 has a second input on line 86 to accept a fifth predetermined number. Third chip counter 84 provides a signal at an output on line 88 when the frame count equals the fifth number.

A long code decision circuit 90 has an input on line 88 operatively connected to the output of third chip counter 84. Long code decision circuit 90 provides the long code candidate with largest select counter total at an output on line 92 in response to an input signal from third chip counter 84.

A second chip counter 94 has a first input on line 52 operatively connected to the first output of correlation comparator 50, and a second input on line 96 to accept a second predetermined number. Second chip counter 94 has a first output on line 68 operatively connected to the input of acceptance counter 66. Second chip counter 94 has a second output on line 40 operatively connected to the second input of integration circuit 38, and a third output on line 42 operatively connected to the third input of integration circuit 38. Second chip counter 94 comparing the chip count to the second number and continues the integrated correlation results with a signal to the second input of integration circuit 38, when the chip count does not equal the second number. Second chip counter 94 relays the correlation accept signal on line 68 to the input of acceptance counter 66 and reinitializes the integration correlation results with a signal to the third input of integration circuit 38, when the chip count does equal the second number.

Second chip counter 94 also includes a third input on line 54 operatively connected to the second output of correlation comparator 50, and a fourth output on line 98 to relay the correlator fail signal. Second chip counter 94 compares the chip count to the second number and continues the integrated correlation results with a signal on line 40 to the second input of integration circuit 38, when the chip count does not equal the second number. Second chip counter 94 relays the correlation fail signal from the fourth output on line 98 and reinitializing the integration correlation results with a signal on line 42 to the third input of integration circuit 38, when the chip count does equal the second number.

A failure counter 100 has an input on line 98 operatively connected to the fourth output of second chip counter 94 to accept the correlator fail signal. Failure counter 100 increments a failure count in response to an input signal and provides the failure count at an output on line 102.

A failure count comparator circuit 104 has an input on line 102 operatively connected to the output of failure counter 100. Failure count comparator 104 compares the failure count to a fourth predetermined number on line 106. Failure count comparator 104 provides a signal at an output on line 108 if the failure count does equal the fourth number.

A rejection counter 110 has an input on line 108 operatively connected to the output of failure count comparator 104. Rejection counter 110 increments a rejection count of the candidate long code in response to an input signal. Rejection counter 110 provides the rejection count of each long code candidate at a first output on line 112 and a signal to select a new long code candidate at a second output on line 64 operatively connected to the input of long code generator 62.

Third chip counter 84 includes a third input on line 112 to accept the rejection count. Third chip counter 84 includes the rejection count in the frame count, and passes the rejection count to long code decision circuit 90. Long code decision circuit 90 considers the rejection count, as well as the select count, in the selection of a long code.

Figure 5:
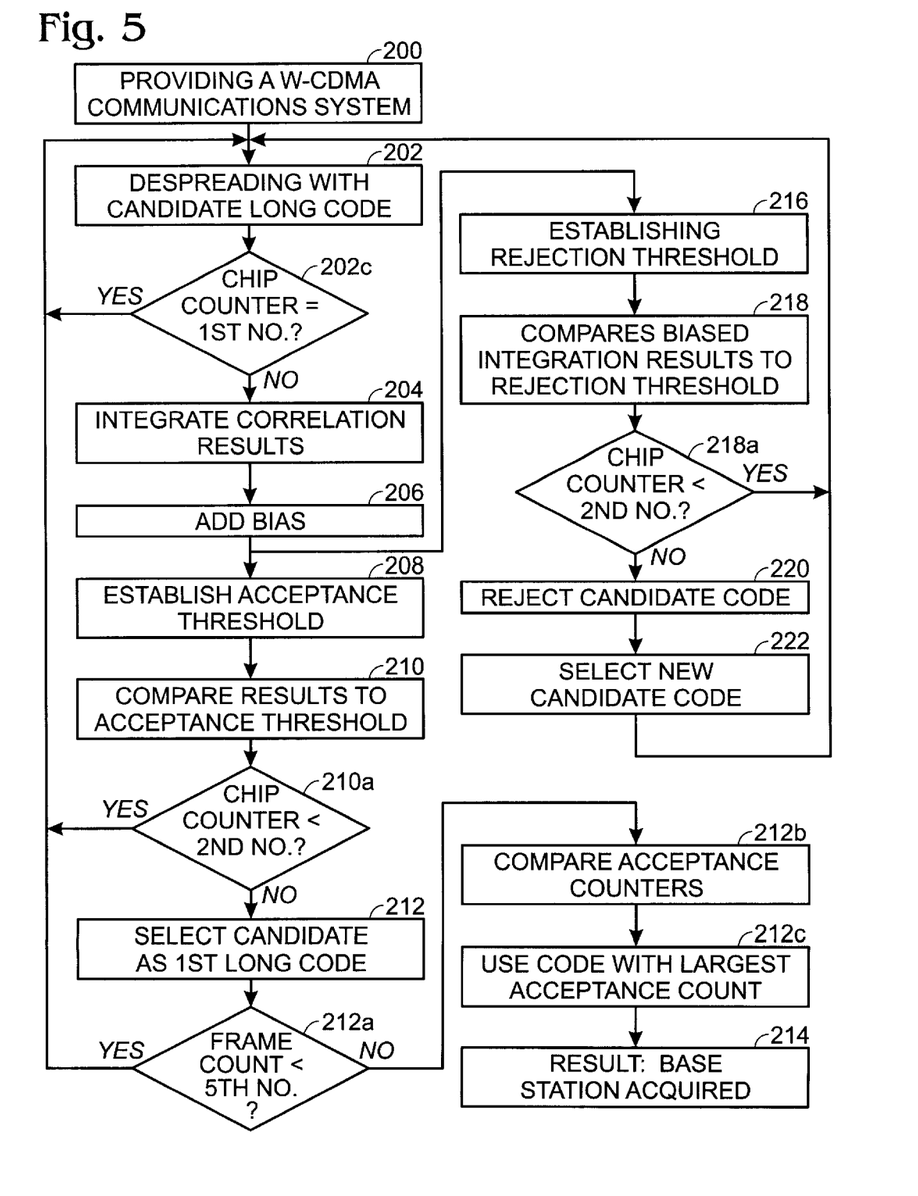
FIG. 5 is a flowchart illustrating a method for a mobile station receiver to acquire the base station through the sequential detection of the first long code from a plurality of long code candidates.

FIG. 5 is a flowchart illustrating a method for a mobile station receiver to acquire the base station through the sequential detection of the first long code from a plurality of long code candidates. Step 200 provides a W-CDMA communications system having a base station transmitting at least one channel of information spread with a unique first long code. Step 202 despreads the received channel with a candidate long code. Step 204 continuously integrates the output of the despreading process of Step 202. Step 206 adds a bias to the integrated output of Step 204. Step 208 establishes an acceptance threshold. Step 210 compares the biased integrated output to the acceptance threshold. Step 212 selects a candidate long code as the first long code in response to the comparison of Step 210. Step 214 is a result, where the base station is acquired.

In some aspects of the invention, further steps following Step 206. Step 216 establishes a rejection threshold. Step 218 compares the biased integrated output to the rejection threshold. Step 220, in response to the comparison to the rejection threshold, rejects the candidate long code as the transmitted long code. Step 222 selects a new long code candidate.

In some aspects of the invention, Step 200 provides that the channel of information spread with the first code is subject to fading in transmission from the base station to the mobile station receiver. Then, a further step (not shown) follows Step 202. Step 202*a* measures the amount of fade in the received channel of information. Then, Step 206 includes adjusting the bias in response to the amount of measured fade, whereby the number of incorrect long code acceptance/rejection selections are reduced, and the searching speed is improved.

In some aspects of the invention, Step 200 provides that the transmitted channel has a long code masked symbol. Then, a further step (not shown) follows Step 202. Step 202*b* measures the amplitude, or signal strength of the despread transmitted channel during the long code masked symbol. Then, Step 206 includes adjusting the bias value in response to the amplitude measured during the long code masked symbol, whereby the bias value is adjusted for the effects of fading. Typically, Step 202*b* includes measuring the amplitude of the long code masked symbol, and Step 206 includes adjusting the bias value periodically, once every slot. Alternately, the bias is measured more than once a slot when additional long code masked symbols are established in the communication protocol. In another alternative, the bias is not measured every slot for situation, where less accurate computations are acceptable.

In some aspects of the invention, Step 200 provides that each long code includes a plurality of sequential chips. Then, Step 202 includes maintaining a chip counter of the number of chips despread. A further step (not shown) follows Step 202. Step 202*c* compares the chip counter to a first predetermined number as follows:

when the chip counter is equal to the first number, then reinitializing the system by setting the integrated output in Step 204 to 0, the chip counter to 0, and the bias to 0, and returning to Step 202, whereby the time for each accept/reject decision is limited; and when the chip counter is less than the first number, then continuing.

In some aspects of the invention, Step 200 provides that each long code includes a plurality of sequential chips. Step 202 includes maintaining a chip counter of the number of chips despread. Then, a further step follows Step 210. Step 210*a* compares the chip counter to a second predetermined number as follows:

when the chip counter is less than the second number, then returning to Step 202, whereby a decision is postponed on account of insufficient data; and when the chip counter is greater than, or equal to the second number, then resetting the chip counter and continuing.

A further step also follows Step 218. Step 218*a* compares the chip counter to a second predetermined number as follows:

when the chip counter is less than the second number, then returning to Step 202, whereby a decision is postponed on account of insufficient data; and when the chip counter is greater than, or equal to the second number, then resetting the chip counter and continuing.

In some aspects of the invention, Step 200 provides a third predetermined number as the safety factor. Then, Steps 202 through 212 are repeated a plurality of times equal to the third number, whereby the candidate code is checked several times before it is selected as the first long code.

In some aspects of the invention, Step 202 includes maintaining a chip counter to count the number of frames despread, and Step 212 includes updating an acceptance counter for every selected long code. Then, a further step follows Step 212. Step 212a compares the frame count in Step 202 to a fifth predetermined number as follows:

when the frame count is less than the fifth number, then going to Step 202; and when the frame count is greater than the fifth number, continuing.

Step 212b compares the acceptance counter of each long code selected in Step 212. Step 212c uses the long code with the largest acceptance count as the code used to despread the transmitted first long code, and resetting the counter.

In some aspects of the invention, Step 200 provides a fourth predetermined number as a safety factor. Then, Steps 216 through 222 are repeated a plurality of times equal to the second number, whereby the candidate code is checked several times before it is rejected as the first long code.

Figure 6:
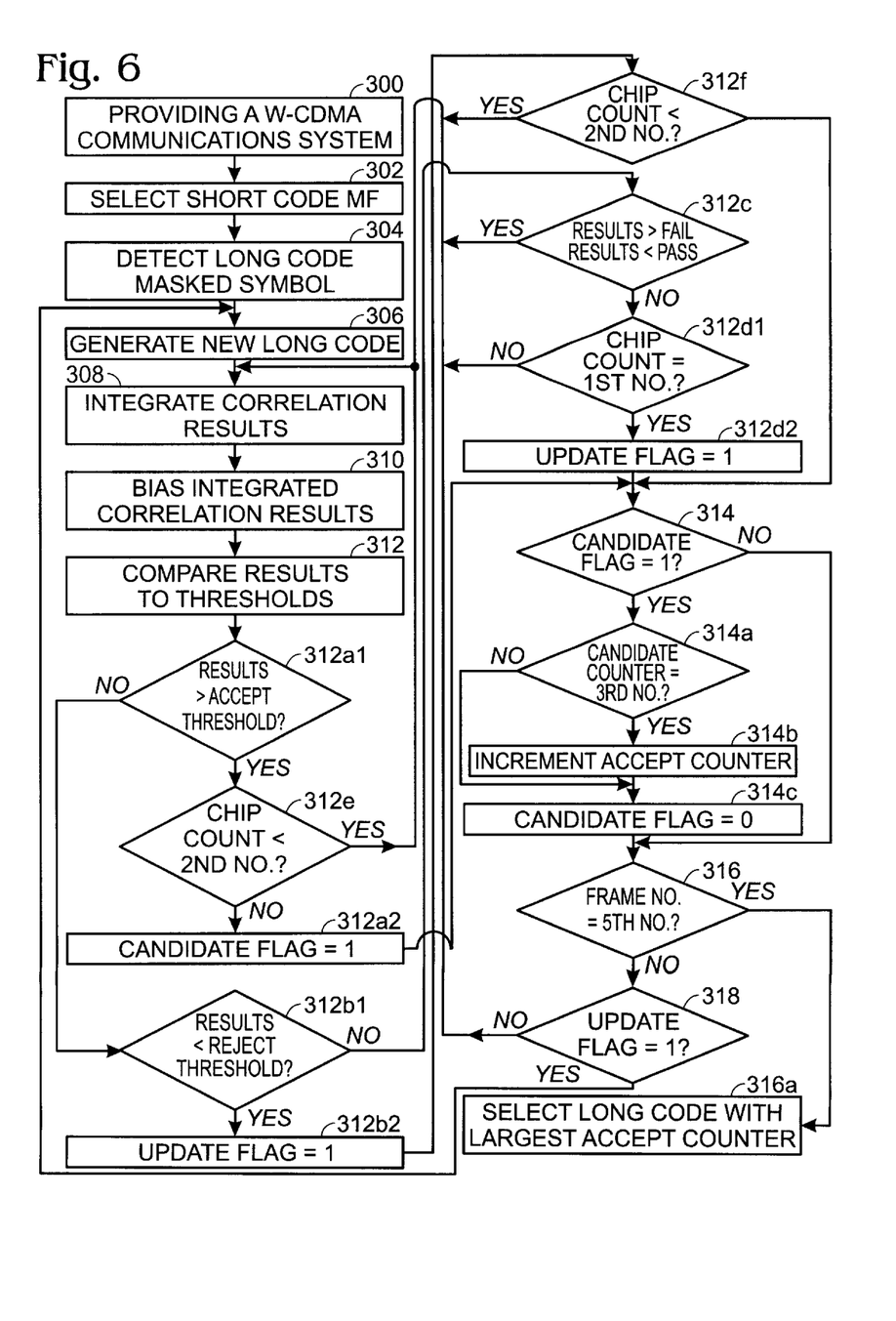
FIG. 6 is a more detailed flowchart illustrating a method for a mobile station receiver to acquire the base station through variable window size sequential detection of the first long code from a plurality of long code candidates.

FIG. 6 is a more detailed flowchart illustrating a method for a mobile station receiver to acquire the base station through variable window size sequential detection of the first long code from a plurality of long code candidates. Step 300 provides a W-CDMA communications system having a base station transmitting at least one channel of information spread with a unique first long code and organized into frames, with each frame including a first predetermined number of slots, and each slot including a first predetermined number of chips. Step 302 selects the short code matched filter output peak whose corresponding long code is to be identified, whereby the received signal frame, slot, and symbol timing is determined. Step 304 detects the peak short code matched filter output, when the long code masked symbol occurs, whereby the bias parameter is determined for every slot. Step 306 generates a new candidate long code, setting candidate and update flags to 0, and candidate counter to 0. Step 308 integrates the results of the chip correlation of the candidate long code generated in Step 306 and the received first long code.

Step 310, in response to the bias determined in Step 304, adjusts the integrated correlation results of Step 308. Step 312 compares the results of the biased chip correlation of Step 310 to acceptance and rejection thresholds as follows:

Step 312a1 decides when results are greater than, or equal to, an acceptance threshold, then Step 312a2 sets the candidate flag equal to 1, and increments the candidate counter, whereby the candidate long code is potentially selected;

Step 312b1 decides when results are less than, or equal to, the rejection threshold, then, Step 312b2 sets the update flag equal to 1, whereby the candidate long code is rejected; and Step 312c, when results are less than the pass threshold, but greater than the fail threshold, goes to Step 308, whereby a decision on the candidate long code is postponed.

Step 314, if candidate flag is equal to 1, compares the candidate counter to a third predetermined number as follows:

Step 314a decides when candidate counter is equal to the third number, Step 314b increments an acceptance counter for the candidate long code, setting the update flag to 1, and the candidate flag to 0; and Step 314c decides when candidate counter is less than the third number, setting the candidate flag to 0.

Step 316 compares the number of frames correlated to a fifth number as follows:

if the number of frames equals the fifth number, then selecting the long code in Step 316a with the largest acceptance counter as the transmitted long code and resetting all acceptance counters; and if the number of frames is less than the fifth number, continuing.

Step 318 checks the update flag as follows:

if update flag is set to 1, then reinitializing correlator integration, resetting update flag to 0, and going to Step 306; and if update flag is set to 0, reinitializing the correlation integrator, and going to Step 308.

In some aspects of the invention, further steps follows Step 312c. Step 312d1 compares the number of correlated chips to a first predetermined number. If the number of correlated chips equals the first number, then Step 312d2 sets the update flag to 1, whereby the process continues to Step 306. A search limit is reached and a new code selected as a candidate. Otherwise, the process continues to Step 308.

In some aspects of the invention, further steps follow Step 312a. Step 312e compares the number of correlated chips to a second predetermined number as follows:

i) if the number of correlated chips is less than the second number, then the candidate and update flags are not changed, and the process goes to Step 308, whereby a decision is postponed until more data is considered; and ii) else, continuing.

In some aspects of the invention, further steps follow Step 312b. Step 312f compares the number of correlated chips to the second number as follows:

i) if the number of correlated chips is less than the second number, then the candidate and update flags are not changed, and the process goes to Step 308, whereby a decision is postponed until more data is obtained; and ii) else, continuing.

For simplicity, the same, second, number has been used, above, for both the pass and fail analysis. That is, Steps 312e and 312f both make comparisons of the chip count to a second number. However, a larger number is typically used for the pass criteria (Step 312e) to insure the selection of the proper code and to permit a quicker rejection of incorrect long code candidates.

In some aspects of the invention, Step 306 includes setting a fail flag and fail counter to 0, and Step 312b includes setting the fail flag to 1 and incrementing a fail counter. Then, a further step follows Step 312 (not shown). Step 314d, if the fail flag is set to 1, compares the fail counter to a fourth predetermined number as follows:

when fail counter is equal to the fourth number, incrementing a rejection counter for the candidate long code, and setting the update flag to 1 and the fail flag to 0; and when fail counter is less than the fourth number, setting fail flag to 0, whereby a candidate long code is given a number of trials before it is rejected.

The searching method of the present invention was simulated in a Rayleigh multipath fading environment for a variety of parameter settings and $E_b/N_0$ values. The time $T_4$ specified for the Phase 4 of the search (long code identification) is given as:

$T_4 = N \times 32 \text{ slots} \times C_g/4$ where N is the number of perch channels to identify. Thus, to identify one perch channel, $T_4 = C_g/2$ frames. A goal is set of evaluating the performance of the algorithm with $T_4$ set to ¼ of this value, i.e. $C_g/8$ frames.

The spread signal was passed through a channel model that simulated Rayleigh multipath fading on a frame by frame basis. The channel model was based on the tapped delay line model. The channel selected is the "Channel B" having a CLASSIC Doppler spectrum and is suggested by the Joint Technical Centre (Air) Standards Contribution, Technical Report on RF Channel Characteristics and System Development Modeling, JTC (Air)/94.09.23-065R 6 Edition, September, 1994, for urban/sub-urban low-rise situations. The tap values are given in Table 1.

TABLE 1

| TAP | REL. DELAY (nsec) | Avg. POWER (dB) |
|---|---|---|
| 1 | 0 | −2.5 |
| 2 | 300 | 0 |
| 3 | 8900 | −12.8 |
| 4 | 12900 | −10 |
| 5 | 17100 | −25.2 |
| 6 | 20000 | −16 |

The conditions chosen are as follows:

$C_g = 16$ codes are chosen; the corresponding long code indices are {1, 16}. Without much loss of generality, the long code with index=15 was chosen in all simulations to be the code actually used on the perch channel. Further, the long code is identified in the path corresponding to Tap 1 in Table 1.

$N_{frame} = C_g/8 = 2$ frames.

MAX_CORR_LEN=128 chips.

The bias scaling parameter $B_c$ (Equation 1, above)=10.

The simulation was run for 100 frames. In the first column, the perch channel is given. In the second and third columns, the number of total and correct "raw" decisions over the 100 frame span are given. In the fourth and fifth columns, the number of correct and incorrect "processed" decisions of the maximum "hit" count detector operating over frames is given. (These two numbers should therefore add up to 50).

The first four symbols in each slot, which contain the pilot symbols, are treated in the same manner as the remaining data symbols. The correlation is truncated and reinitialized if it is crossing a symbol boundary.

TABLE 2

| $T_{up}$ = 25000, $T_{down}$ = −300,100 frames | | | | |
|---|---|---|---|---|
| $E_b/N_o$(dB) | "raw" total | "raw" correct | processed correct | processed incorrect |
| 5.9897 | 2283 | 378 | 37 | 13 |
| 8.98969 | 512 | 392 | 50 | 0 |
| 10.98969 | 508 | 506 | 50 | 0 |

TABLE 3

| $T_{up}$ = 30000, $T_{down}$ = −200,100 frames | | | | |
|---|---|---|---|---|
| $E_b/N_o$(dB) | "raw" total | "raw" correct | processed correct | processed incorrect |
| 5.9897 | 1191 | 273 | 40 | 10 |
| 8.98969 | 294 | 267 | 49 | 1 |
| 10.98969 | 297 | 297 | 50 | 0 |

TABLE 4

| $T_{up}$ = 35000, $T_{down}$ = −150,100 frames | | | | |
|---|---|---|---|---|
| $E_b/N_o$(dB) | "raw" total | "raw" correct | processed correct | processed incorrect |
| 5.9897 | 592 | 186 | 35 | 15 |
| 8.98969 | 184 | 180 | 47 | 3 |
| 14.98969 | 210 | 210 | 49 | 1 |

As the above examples show, with a suitable choice of parameters, it is possible to obtain very reliable estimates of the long code index for perch channel above approximately 9 dB. This figure represents a margin of about 3 dB over the operating point of the traffic channel (6 dB for a BER of $10^{-3}$). As the $T_{up}$ is increased, the number of false alarms decreases, while the number of correctly detected peaks also slightly decreases. By decreasing the lower threshold (in magnitude), the number of false alarms decreases, at the risk of increased miss probability, leading once again to increased errors in the processed decisions.

Considering these factors, a choice of the thresholds as in Table 3, above, offers the best compromise performance. The results also show the importance of the maximum detector in detection method, especially for values in the low range.

A system and method has been presented to permit the use of the sequential detection of an unknown spreading code in an environment where the signal to noise ratio of the received signal varies. A communication system, such as W-CDMA, is needed to supply a periodic reference signal that the receiver can demodulate without the spreading code. The reference signal is used to estimate and constantly update the signal to noise ratio. From this estimate a bias is determined for use in the sequential detection of the spreading code. Other variations and embodiments will occur to those skilled in the art.

What is claimed is:

1. In a wideband code division multiple access (W-CDMA) communications system having a base station transmitting at least one channel of information spread with a unique first long code, a method for a mobile station receiver to acquire the base station through the sequential detection of the first long code from a plurality of long code candidates, the method comprising the steps of:

a) despreading the received channel with a candidate long code;

b) continuously integrating the output of the despreading process of Step a);

c) adding a bias to the integrated output of Step b);

d) establishing an acceptance threshold;

e) comparing the biased integrated output to the acceptance threshold; and f) selecting a candidate long code as the first long code in response to the comparison of Step e), whereby the base station is acquired.

2. A method as in claim 1 including further steps, following Step c), of:
- g) establishing a rejection threshold;
- h) comparing the biased integrated output to the rejection threshold;
- i) in response to the comparison to the rejection threshold, rejecting the candidate long code as the transmitted long code; and
- j) selecting a new long code candidate.

3. A method as in claim 2 wherein the channel of information spread with the first code is subject to fading in transmission from the base station to the mobile station receiver, and including a further step, following Step a), of:
- $a_1$) measuring the amount of fade in the received channel of information; and
- in which Step c) includes adjusting the bias in response to the amount of measured fade, whereby the number of incorrect long code acceptance/rejection selections are reduced.

4. A method as in claim 3 wherein the transmitted channel has a long code masked symbol, and including a further step, following Step a), of:
- $a_2$) measuring the amplitude of the despread transmitted channel during the long code masked symbol; and
- in which Step c) includes adjusting the bias value in response to the amplitude measured during the long code masked symbol, whereby the bias value is adjusted for the effects of fading.

5. A method as in claim 4 in which Step $a_2$) includes measuring the amplitude of the long code masked symbol, and Step c) includes adjusting the bias value periodically, once every slot.

6. A method as in claim 2 wherein each long code includes a plurality of sequential chips, and in which Step a) includes maintaining a chip counter of the number of chips despread, and including a further step, following Step a), of:
- $a_3$) comparing the chip counter to a first predetermined number as follows:
  1) when the chip counter is equal to the first number, then reinitializing the system by setting the integrated output in Step b) to 0, the chip counter to 0, and the bias to 0, and returning to Step a), whereby the time for each accept/reject decision is limited; and
  2) when the chip counter is less than the first number, then continue.

7. A method as in claim 2 wherein each long code includes a plurality of sequential chips, and in which Step a) includes maintaining a chip counter of the number of chips despread, and including a further step, following Step e), of:
- $e_1$) comparing the chip counter to a second predetermined number as follows:
  1) when the chip counter is less than the second number, then returning to Step a), whereby a decision is postponed on account of insufficient data; and
  2) when the chip counter is greater than, or equal to the second number, then reset the chip counter and continue;

and including a further step, following Step h), of:
- $h_1$) comparing the chip counter to a second predetermined number as follows:
  1) when the chip counter is less than the second number, then returning to Step a), whereby a decision is postponed on account of insufficient data; and
  2) when the chip counter is greater than, or equal to the second number, then reset the chip counter and continue.

8. A method as in claim 2 wherein a fourth predetermined number is provided as a safety factor, and in which Steps g) through j) are repeated a plurality of times equal to the second number, whereby the candidate code is checked several times before it is rejected as the first long code.

9. A method as in claim 1 wherein a third predetermined number is provided as the safety factor, and in which Steps a) through f) are repeated a plurality of times equal to the third number, whereby the candidate code is checked several times before it is selected as the first long code.

10. A method as in claim 1 in which Step a) includes maintaining a chip counter to count the number of frames despread, in which Step f) includes updating an acceptance counter for every selected long code, and including a further step, following Step f), of:
- $f_1$) comparing the frame count in Step a) to a fifth predetermined number as follows:
  1) when the frame count is less than the fifth number, then go to Step a); and
  2) when the frame count is greater than the fifth number, continue
- $f_2$) comparing the acceptance counter of each long code selected in Step f); and
- $f_3$) using the long code with the largest acceptance count as the code used to despread the transmitted first long code, and resetting the counter.

11. In a wideband code division multiple access (W-CDMA) communications system having a base station transmitting at least one channel of information spread with a unique first long code and organized into frames, with each frame including a predetermined number of slots, and each slot including a predetermined number of chips, a method for a mobile station receiver to acquire the base station through variable window size sequential detection of the first long code from a plurality of long code candidates, the method comprising the steps of:
- a) selecting the short code matched filter output peak whose corresponding long code is to be identified, whereby the received signal frame, slot, and symbol timing is determined;
- b) detecting the peak short code matched filter output, when the long code masked symbol occurs, whereby a bias parameter is determined for every slot;
- c) generating a new candidate long code, setting candidate and update flags to 0, and candidate counter to 0;
- d) integrating the results of the chip correlation of the candidate long code generated in Step c) and the received first long code;
- e) in response to the bias determined in Step b), adjusting the integrated correlation results of Step d);
- f) comparing the results of the biased chip correlation of Step e) to acceptance and rejection thresholds as follows:
  1) when results are greater than, or equal to, an acceptance threshold, then setting the candidate flag equal to 1, and incrementing the candidate counter, whereby the candidate long code is potentially selected;
  2) when results are less than, or equal to, the rejection threshold, setting the update flag equal to 1, whereby the candidate long code is rejected; and
  3) when results are less than the pass threshold, but greater than the fail threshold, go to Step d), whereby a decision on the candidate long code is postponed;
- g) if candidate flag is equal to 1, then compare the candidate counter to a third predetermined number as follows:

1) when candidate counter is equal to the third number, incrementing an acceptance counter for the candidate long code, setting the update flag to 1, and the candidate flag to 0; and
2) when candidate counter is less than the third number, setting the candidate flag to 0;

h) comparing the number of frames correlated to a fifth number as follows:
1) if the number of frames equals the fifth number, then selecting the long code with the largest acceptance counter as the transmitted long code and reset all acceptance counters; and
2) if the number of frames is less than the fifth number, continuing; and i) checking the update flag as follows:
1) if update flag is set to 1, then reinitializing correlator integration, resetting update flag to 0, and going to Step c); and
2) if update flag is set to 0, reinitialize the correlation integrator, and going to Step d).

12. A method as in claim 11 in which Step f)3) includes comparing the number of correlated chips to a first predetermined number, and in which Step f)3) includes the sub-steps of:
i) if the number of correlated chips equals the first number, then setting the update flag to 1, whereby the process continues to Step c) where a search limit is reached and a new code selected as a candidate; and
ii) else, continuing to Step d).

13. A method as in claim 11 in which Step f)1) includes comparing the number of correlated chips to a second predetermined number, and in which Step f)1) includes the sub-steps of:
i) if the number of correlated chips is less than the second number, then not changing the candidate and update flags, and going to Step d), whereby a decision is postponed until more data is considered; and
ii) else, continuing; and in which Step f)2) includes comparing the number of correlated chips to the second number, and in which Step f)2) includes the sub-steps of:
i) if the number of correlated chips is less than the second number, then not changing the candidate and update flags, and going to Step d), whereby a decision is postponed until more data is obtained; and
ii) else, continuing.

14. A method as in claim 13 in which Step c) includes setting a fail flag and fail counter to 0, in which Step f)2) includes setting the fail flag to 1 and incrementing a fail counter, and including a further step, following Step f), of
$g_1$) if the fail flag is set to 1, comparing the fail counter to a fourth predetermined number as follows:
1) when fail counter is equal to the fourth number, incrementing a rejection counter for the candidate long code, and setting the update flag to 1 and the fail flag to 0; and
2) when fail counter is less than the fourth number, setting fail flag to 0, whereby a candidate long code is given a number of trials before it is rejected.

15. In a wideband code division multiple access (W-CDMA) communication system including a base station transmitting a channel of information spread with a unique first long code, a sequential searching receiver with adaptive threshold biasing comprising:
a short code matched filter having an input to receive the transmitted channel of information spread with the first long code, and an output to provide an output peak signal corresponding to the first long code masked symbol;
a timing and code management circuit having an input operatively connected to said short code matched filter output, said timing and code management circuit computing a bias based on the amplitude of the first long code masked symbol peak output, and computing timing relationships from the interval between long code masked symbol peak outputs, said timing and code management circuit having an output to provide the bias; and
a searcher unit having a first input to accept the transmitted spread first long code and a second input operatively connected to said timing and code management circuit output, said searcher unit correlating the first long code against candidate long codes, integrating the correlation results, using the bias to adjust the integrated correlation results, and comparing the biased integrated correlation results to pass/fail criteria, said searcher generating a selected candidate code to despread the first long code, whereby the bias adjusts for the effects of fading in the transmitted signal.

16. A receiver as in claim 15 in which said searcher unit further comprises:
a mixer having a first input operatively connected to said searcher first input to accept the transmitted first long code spread channel, a second input to accept the candidate long code, and an output to provide the correlation results;
an integration circuit having a first input operatively connected to said mixer output, a second input to receive the chip count signal to integrate the correlation results over the next chip, a third input to receive a reinitialize signal to reinitialize the correlation results, and an output to provide the integrated correlation results;
a summing circuit having a first input operatively connected to said integrator output, a second input operatively connected to said searcher second input to accept the bias, and an output to provide the integrated and biased correlation results;
a correlation comparator having a first input operatively connected to said summing circuit output, said correlation comparator comparing the integrated and biased correlation results to a pass threshold and a fail threshold, said correlation comparator having a first output to provide a signal when the biased correlation results exceed the pass threshold, a second output to provide a signal when the biased correlation results are less than the fail threshold, and a third output to provide a signal when the biased correlation results meet neither the pass nor fail criterion;
a first chip counter circuit having a first input operatively connected to said correlation comparator third output, and a first output operatively connected to said integration circuit second input to increment the chip count by one;
a long code candidate generator having an output operatively connected to said mixer second input to provide the candidate long code, and an input, said long code candidate generator providing a new candidate long code in response to a signal at the input;
an acceptance counter having an input operatively connected to said correlation comparator first output to accept the pass criteria signal, said acceptance counter incrementing an acceptance count in response to an input signal and providing the acceptance count at an output;

an acceptance count comparator circuit having an input operatively connected to said acceptance counter output, said acceptance count comparator comparing the acceptance count to a third predetermined number, said acceptance count comparator providing a signal at an output, if the acceptance count does equal the third number;

a select counter having an input operatively connected to said acceptance count comparator output, said select counter incrementing the select count of each long code candidate in response to an input signal, said select counter providing the select count at a first output and a signal to select a new long code candidate at a second output operatively connected to said long code generator input;

a third chip counter having a first input operatively connected to said select counter output to check the number of frames processed in response to an input signal, and a second input to accept a fifth predetermined number, said third chip counter providing a signal at an output when the frame count equals the fifth number;

a long code decision circuit having an input operatively connected to said third chip counter output, said long code decision circuit providing the long code candidate with largest select counter total at an output in response to an input signal from said third chip counter.

17. A receiver as in claim 16 in which said first chip counter has a second input to accept a first predetermined number, said first chip counter compares the chip count to the first number, said first chip counter having a second output operatively connected to said integration circuit third input to reinitialize the integration process after a pass/fail decision is not reached within the first number of correlated chips.

18. A receiver as in claim 16 further comprising:
a second chip counter having a first input operatively connected to said correlation comparator first output, a second input to accept a second predetermined number, a first output operatively connected to said acceptance counter input, a second output operatively connected to said integration circuit second input, and a third output operatively connected to said integration circuit third input, said second chip counter comparing the chip count to the second number and continuing the integrated correlation results with a signal to said integration circuit second input, when the chip count does not equal the second number, and said second chip counter relaying the correlation accept signal to said acceptance counter input and reinitializing the integration correlation results with a signal to said integration circuit third input, when the chip count does equal the second number.

19. A receiver as in claim 18 in which said second chip counter includes a third input operatively connected to said correlation comparator second output, and a fourth output to relay the correlator fail signal, said second chip counter compares the chip count to the second number and continues the integrated correlation results with a signal to said integration circuit second input, when the chip count does not equal the second number, and said second chip counter relaying the correlation fail signal from the fourth output and reinitializing the integration correlation results with a signal to said integration circuit third input, when the chip count does equal the second number.

20. A receiver as in claim 19 further comprising:
a failure counter having an input operatively connected to said second chip counter fourth output to accept the correlator fail signal, said failure counter incrementing a failure count in response to an input signal and providing the failure count at an output;

a failure count comparator circuit having an input operatively connected to said failure counter output, said failure count comparator comparing the failure count to a fourth predetermined number, said failure count comparator providing a signal at an output if the failure count does equal the fourth number;

a rejection counter having an input operatively connected to said failure count comparator output, said rejection counter incrementing a rejection count of the candidate long code in response to an input signal, said rejection counter providing the rejection count of each long code candidate at a first output and a signal to select a new long code candidate at a second output operatively connected to said long code generator input;

in which said third chip counter includes a third input to accept the rejection count, said third chip counter including the rejection count in the frame count and passing the rejection count to said long code decision circuit; and in which said long code decision circuit considers the rejection count, as well as the select count, in the selection of a long code.

* * * * *